Figure 1:
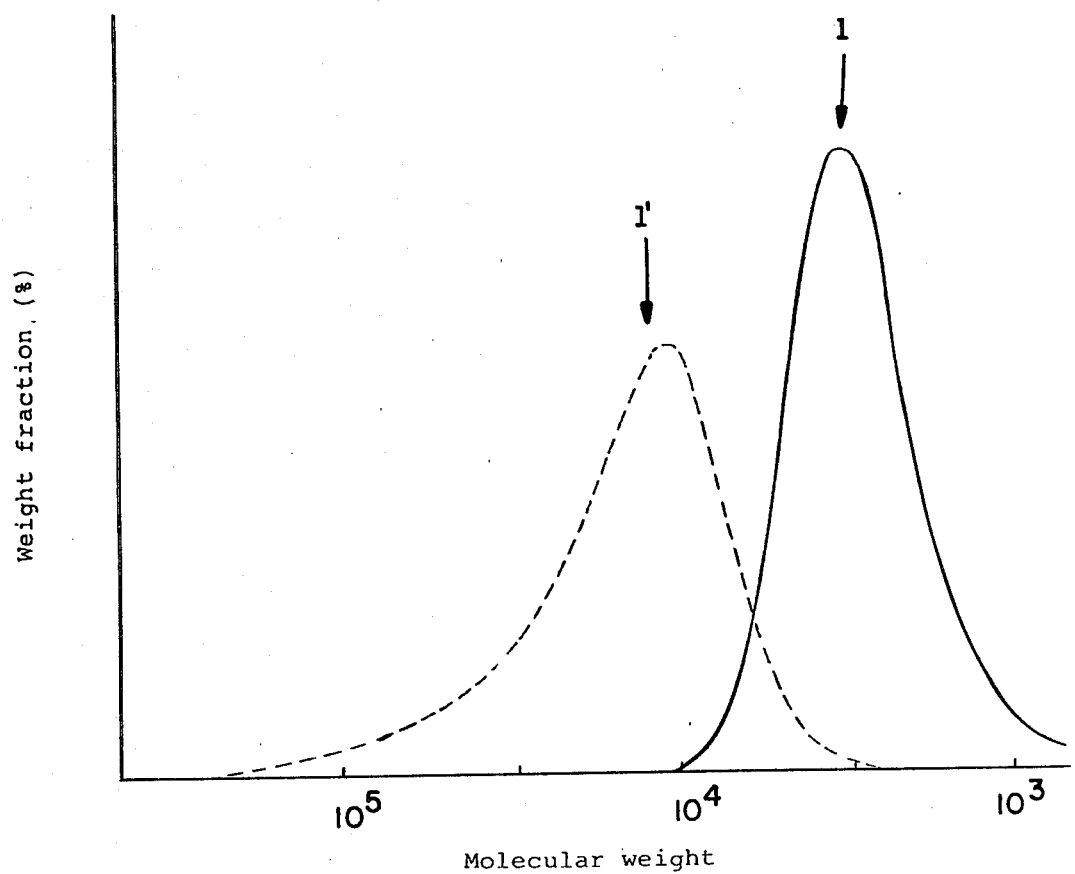

United States Patent [19]

Tatemoto et al.

[11] 4,361,678
[45] Nov. 30, 1982

[54] LIQUID FLUORINE-CONTAINING POLYMER AND ITS PRODUCTION WITH IODINATED COMPOUND

[75] Inventors: Masayoshi Tatemoto; Shigeru Morita, both of Osaka, Japan

[73] Assignee: Daikin Kogyo Co., Ltd., Osaka, Japan

[21] Appl. No.: 198,221

[22] Filed: Oct. 17, 1980

[30] Foreign Application Priority Data

Oct. 17, 1979 [JP] Japan .................. 54-134476

[51] Int. Cl.³ .............. C08F 14/16; C08F 14/22; C08F 259/08
[52] U.S. Cl. .................. 528/374; 525/384; 525/350; 525/387; 526/255; 528/392; 528/367; 525/416
[58] Field of Search ................ 526/255; 525/331

[56] References Cited

U.S. PATENT DOCUMENTS 4,243,770  6/1981  Tatemoto et al. ........ 525/331

FOREIGN PATENT DOCUMENTS 2815187 10/1978 Fed. Rep. of Germany ...... 525/331

930757 7/1963 United Kingdom .............. 525/331

Primary Examiner—Joseph L. Schofer
Assistant Examiner—Peter F. Kulkosky
Attorney, Agent, or Firm—Birch, Stewart, Kolasch & Birch

[57] ABSTRACT

A process for producing a readily crosslinkable liquid, fluorine-containing polymer having a narrow range of molecular weight distribution and containing iodine in the molecule in an amount of 1 to 30% by weight based on the weight of the polymer, which comprises polymerizing vinylidene fluoride and at least one other fluoroolefin in the presence of a radical-producing source and an iodinated compound of the formula: $Rf/I_x$ wherein Rf is a saturated perfluorocarbon group, a saturated perfluorochlorocarbon group or a saturated fluorochlorohydrocarbon group and x is an integer of not less than 1 corresponding to the bonding valency of Rf while maintaining the proportion of the mole number of the monomeric components (M) to the mole number of the iodinated compound (I) in a range between 10 and 1,200.

15 Claims, 2 Drawing Figures

LIQUID FLUORINE-CONTAINING POLYMER AND ITS PRODUCTION WITH IODINATED COMPOUND

The present invention relates to a liquid fluorine-containing polymer and its production. More particularly, it relates to a readily crosslinkable liquid, fluorine-containing polymer having a certain amount of iodine in the molecule and a narrow range of molecular weight distribution, and its production by polymerization of vinylidene fluoride with a least one other fluoroolefin in the presence of an iodinated compound and a radical-producing source.

A crosslinkable fluorine-containing polymer having a certain amount of iodine in the molecule and its production are disclosed in Japanese Patent Publication (unexamined) No. 125,491/78. As the result of a subsequent study on the production or such a polymer, it has been found that the selection of certain specific conditions in the polymerization can afford easily and efficiently a readily crosslinkable liquid, fluorine-containing polymer having a relatively low molecular weight and a relatively narrow range of molecular weight distribution.

According to the present invention, there is provided a process for preparing a readily crosslinkable liquid, fluorine-containing polymer having a narrow range of molecular weight distribution and containing iodine in the molecule in an amount of 1 to 30% by weight on the basis of the weight of the polymer which comprises polymerizing vinylidene fluoride with one or more other fluoroolefins in the presence of an iodinated compound of the formula: $RfI_x$ wherein Rf is a saturated perfluorocarbon group, a saturated perfluorochlorocarbon group or a saturated fluorochlorohydrocarbon group and x is an integer of not less than 1 corresponding to the bonding valency of the group Rf, and a radical-producing source while maintaining the proportion of the mole number of the said monomeric components (M) to the mole number of the iodinated compound (I) in the polymerization system in a range of 10 to 1200.

The polymerization in the process of the present invention may be carried out in any conventional polymerization procedure such as bulk polymerization, solution polymerization, suspension polymerization or emulsion polymerization. In view of the ease in controlling the reaction conditions and attainment of better polymer yields, emulsion polymerization is the most preferred.

One of the monomeric components to be subjected to polymerization is vinylidene fluoride. The amount of vinylidene fluoride is usually from 10 to 90 mole %, preferably from 40 to 80 mole % on the basis of the monomeric components. When the amount is from 40 to 80 mole %, the produced polymer is assured to be sufficiently and satisfactorily elastomeric on the crosslinking.

The other monomeric component to be polymerized with vinylidene fluoride is any other fluoroolefin, of which examples are as follows: tetrafluoroethylene, trifluoroethylene, vinyl fluoride, chlorotrifluoroethylene, hexafluoropropylene, pentafluoropropylene, perfluorocyclobutylene, perfluoro(methyl vinyl ether), perfluoro(ethyl vinyl ether), perfluoro(propyl vinyl ether), etc.

The iodinated compound may be one having one or more iodine atoms and being so stable as not undertaking any side reaction under the polymerization conditions to lose its effectiveness. The group Rf in the iodinated compound may be a saturated perfluorocarbon group, a saturated perfluorochlorocarbon group or a saturated fluorochlorohydrocarbon group, each bearing optionally one or more functional groups (e.g —O—, —S—, Rf—N=, —COOH, —SO$_3$H, —PO$_3$H) and having preferably 1 to 8 carbon atoms. Further, the carbon atom to which the iodine atom is bonded is preferred to have at least one fluorine atom or at least one perfluorocarbon group, particularly to bear only the fluorine atom(s) and/or the perfluorocarbon atom(s) at the remaining bonds of such carbon atom. In view of easy availability, the iodinated compound having one or two iodine atoms is commonly used.

Examples of the iodinated compound are monoiodoperfluoromethane, monoiodoperfluoroethane, monoiodoperfluoropropane, monoiodoperfluorobutane (e.g. 2-iodoperfluorobutane, 1-iodoperfluoro(1,1-dimethylethane)), monoiodoperfluoropentane (e.g. 1-iodoperfluoro(4-methylbutane)), 1-iodoperfluoro-n-nonane, monoiodoperfluorocyclobutane, 2-iodoperfluoro(1-cyclobutyl)ethane, monoiodoperfluorocyclohexane, monoiodotrifluorocyclobutane, monoiododuifluoromethane, monoiodomonofluoromethane, 2-iodo-1-hydroperfluoroethane, 3-iodo-1-hydroperfluoropropane, monoiodomonochlorodifluoromethane, monoiododichloromonofluoromethane, 2-iodo-1,2-dichloro-1,1,2-trifluoroethane, 4-iodo-1,2-dichloroperfluorobutane, 6-iodo-2-dichloroperfluorohexane, 4-iodo-1,2,4-trichloroperfluorobutane, 1-iodo-2,2-dihydroperfluoropropane, 1-iodo-2-hydroperfluoropropane, monoiodotrifluoroethylene, 3-iodoperfluoropropene-1,4-iodoperfluoropentene-1, 4-iodo-5-chloroperfluoropentene-1, 2-iodoperfluoro(1-cyclobutenyl)ethane, 1,3-diiodoperfluoro-n-propane, 1,4-diiodoperfluoro-n-butane, 1,3-diiodo-2-chloroperfluoro-n-propane, 1,5-diiodo-2,4-dichloroperfluoro-n-pentane, 1,7-diiodoperfluoro-n-octane, 1,2-di(iododifluoromethyl)perfluorocyclobutane, 2-iodo-1,1,1-trifluoroethane, 1-iodo-1-hydroperfluoro(2-methylethane), 2-iodo-2,2-dichloro-1,1,1-trifluoroethane, 2-iodo-2-chloro-1,1,1-trifluoroethane, 2-iodoperfluoroethyl perfluorovinyl ether, 2-iodoperfluoroethyl perfluoroisopropyl ether, 3-iodo-2-chloroperfluorobutyl perfluoromethyl thioether, 3-iodo-4-chloroperfluorobutyric acid, etc. These iodinated compounds are obtainable by conventional procedures; for instance, 2-iodoperfluoropropane can be obtained by reacting hexafluoropropene with iodine in the presence of potassium fluoride; 1,5-diiodo-2,4-dichloroperfluoro-n-pentane can be obtained by reacting silver salt of 3,5-dichloroperfluoro-1,7-heptanedioic acid with iodine; 4-iodo-5-chloroperfluoro-1-pentene can be obtained by reacting perfluoro-1,4-pentadiene with iodine chloride.

The bond between the carbon atom and the iodine atom in the iodinated compound is relatively weak and readily cleaved in the presence of a radical-producing source to produce a radical, of which the reactivity is so high that the addition growth reaction proceeds. This addition growth reaction is terminated by drawing the iodine atom from the iodinated compound, whereby the desired fluorine-containing polymer containing an iodine atom bonded to the carbon atom at the terminal position of the polymeric chain and having a narrow range of molecular weight distribution is obtained.

The M/I proportion in the polymerization system is required to be maintained in a range of 10 to 1200, preferably of 10 to 300. When it is less than 10, the polymerization hardly proceeds. When it is more than 1200, the molecular weight distribution of the produced polymer becomes broad. Depending on the polymerization procedure, the M/I proportion may be somewhat changed; for instance, it may be from 50 to 1200 in case of bulk polymerization and from 10 to 400 in case of emulsion polymerization.

As the radical-producing source, there may be used preferably light or heat. The light used may be in the infrared to ultraviolet region of the electromagnetic radiation spectrum, particularly light not including a chemical ultraviolet ray, which may produce a radical from any bond other than the bond between a carbon atom and an iodine atom. As heat, a temperature of not lower than 100° C., preferably not lower than 200° C., is usable. Ionizing rays are also usable but not preferred because of producing a radical not only from the bond between a carbon atom and an iodine atom but also from any other bond. Depending on the polymerization procedure, there may be employed any radical initiator such as organic or inorganic peroxides, azo compounds, organic metal compounds and metals. Particularly preferred radical initiators are persulfates, hydrogen peroxide, $(Rf'CO)_2O_2$, $Rf'OORf'$, $(Rf')_3COOC(O)OC(Rf')_3$, $N_2F_2$, $Rf'—N=N—Rf'$, $HgRf'_2$, Li, K, Na, Mg, Zn, Hg, Al, etc., $Rf'$ being a polyfluoroalkyl group.

The temperature of the polymerization process may be selected appropriately within the range in which a radical reaction proceeds but that the thermal decomposition of the polymeric chain, as produced, does not take place and is usually from $-20°$ to 150° C. The pressure on polymerization is of no limitation and may be autogenic.

In case of solution polymerization, there may be used a solvent which prevents chain transfer. Specific examples of the solvent are

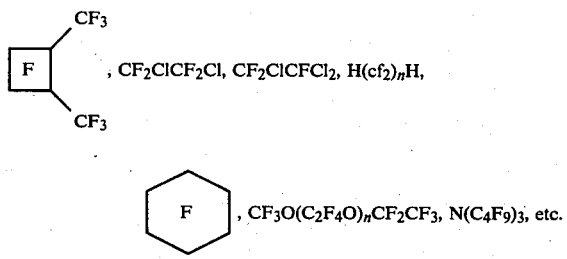

In the case of emulsion polymerization, there is normally employed an emulsifier. When the produced polymer itself exerts any surface active effect and, for instance, has a hydrophilic group such as —COOM, —OH or —SO$_3$M (M being a cation such as hydrogen or metal), the use of any emulsifier is not necessarily required. As the emulsifier, the use of a fluorine-containing surfactant such as salts of fluorine-containing carboxylic acids and fluorine-containing sulfonic acids is favorable. The amount of the emulsifier may be usually not more than 5% by weight on the basis of the weight of water. If desired, any chain transfer agent may be employed, although it does not afford normally any favorable result.

The fluorine-containing polymer prepared by the process of this invention is usually in a liquid state at a temperature from 0° to 150° C. and has preferably a number average molecular weight of 900 to 10,000. When the molecular weight is higher than 10,000, the polymer having a narrow range of molecular weight distribution tends to be hardly obtainable. Preferably, the proportion of the weight average molecular weight ($\overline{M}w$) to the number average molecular weight ($\overline{M}n$) may be from 1.05 to 1.30.

The amount of iodine in the molecule of the polymer is varied with the molecular weight of the polymer and may be usually not less than 1% by weight and not more than 30% by weight based on the weight of the polymer. A preferred range of the amount of such iodine is from 2 to 20% by weight. When the iodine amount is less than 1% by weight, a polymer having a narrow range of molecular weight distribution is hardly obtainable. When the iodine amount is more than 30% by weight, the polymerization hardly proceeds and the produced polymer is inferior in heat resistance and other physical properties. The number of the iodine atom(s) in each molecule of the polymer may be 1 or more but should not be so great as to make the iodine amount over 30% by weight.

The iodine in the molecule of the produced polymer is intended to mean the iodine atom(s) bonded to the carbon atom(s) in the polymeric chain. Usually, the iodine atom(s) are bonded only to the carbon atom(s) present at the terminal position(s) in the polymeric chain, but it sometimes occurs that the iodine atoms are bonded to both of the carbon atom(s) at the terminal position(s) and the carbon atoms(s) at any other position(s). The iodine atom(s) bonded to the carbon atom(s) at the terminal position(s) can contribute in crosslinking, which imparts the readily curable property to the polymer.

The polymer has units of vinylidene fluoride in an amount of 10 to 90 mole % and can be crosslinked in the presence of a crosslinking source. Since the molecular weight distribution of the polymer is extremely narrow, the viscosity is relatively low so that the polymer can be easily handled or processed in comparison with any other polymer having the same average molecular weight as above but being broader in the molecular weight distribution. Further, the molecular weight of the polymer is almost uniform, and therefore the macromolecular polymer obtained by crosslinking of the instant polymer is even in its net structure and has excellent physical and chemical properties. Moreover, the iodine atom at the terminal position is quite reactive so that a reactive functional group such as

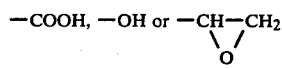

can be introduced with ease for modification of the properties of the polymer.

The polymer has an iodine atom at the terminal position. This terminal iodine atom may be substituted with any other atom or any atomic group by a per se conventional reaction for enhancement of the stability or reactivity of the polymer. For instance, the iodine atom in the polymer may be substituted with an atom such as hydrogen, fluorine, chlorine or bromine or an atomic group such as alkyl, thioalkyl, silyl or fluorine-containing alkyl by the reaction with any reactive compound having such atom or atomic group. Further, for instance, the polymer may be added to any compound having a polymerizable unsaturation bond such as allyl alcohol, α-methylstyrene, diallyl phthalate or tetraallyl pyromellitate. Furthermore, for instance, the addition product may be subjected to coupling. Moreover, for instance, the elimination of hydrogen iodine from the polymer may be carried out.

The crosslinking of the polymer can be accomplished by various crosslinking procedures such as peroxide crosslinking to be effected in the presence of a polyfunctional olefin in an equivalent amount or more to the terminal iodine atom, hydrolysis crosslinking by hydrolysis of the reaction product with vinyl triethoxysilane and crosslinking of epoxy linkages formed by addition of allyl alcohol and hydrogen iodide elimination.

As the source for initiating the crosslinking, there may be used radio-active rays such as $\gamma$ rays, electron rays, $\alpha$ rays, $\beta$ rays and X rays as well as ultraviolet rays. As the crosslinking agent, there are usable organic peroxides, polyamines, polyhydroxy compounds, polythiols, etc.

The organic peroxide is preferred to be the one which can readily produce a peroxy radical in the presence of heat or an oxidation-reduction system. Specific examples are 1,1-bis(t-butylperoxy)-3,5,5-trimethylcyclohexane, 2,5-dimethylhexane-2,5-dihydroxyperoxide, di-t-butyl peroxide, t-butylcumyl peroxide, dicumyl peroxide, $\alpha,\alpha'$-bis(t-butyl-peroxy)-p-diisopropylbenzene, 2,5-dimethyl-2,5-di(t-butyl-peroxy)hexane, 2,5-dimethyl-2,5-di(t-butylperoxy)hexyne-3, benzoylperoxide, t-butylperoxybenzene, 2,5-dimethyl-2,5-di(benzoylperoxy)hexane, t-butylperoxymaleic acid, t-butylperoxiisopropyl carbonate, etc. Among them, an appropriate organic peroxide and its amount may be chosen depending on the amount of —O—O—, the decomposition temperature, etc.

In case of using an organic peroxide, the combined use of a crosslinking aid or a co-crosslinking agent produces a remarkable effect. As the crosslinking aid or the co-crosslinking agent, there may be used the one which is reactive to a peroxy radical and a polymer radical. Specific examples are triallyl cyanurate, triallyl isocyanurate, triacryl formal, triallyl trimellitate, N,N'-m-phenylenedismaleimide, dipropargyl terephthalate, diallyl phthalate, tetraallyl terephthalate, etc.

As the polyamine, there may be used a primary or secondary amine having not less than two basic nitrogen atoms in the molecule. In most cases, the polyamine is employed in the form of a salt in order to make the reactivity mild. Examples are alkylenediamines, and particularly, ethylenediamine carbamate, hexamethylenediamine carbamate, 4,4'-diaminocyclohexylmethane carbamate, etc. are frequently employed. The Schiff's base of N,N'-dicynnamylidene-1,6-hexamethylenediamine is also employed often. When a weakly basic polyamine such as a polyamine aromatic compound is employed, it may be used in combination with any other basic compound such as diphenylguanidine, di-O-triguanidine, diphenylthiourea or 2-mercaptoimidazoline. A compound having —NH$_2$ or —NH— in the molecule and being used as a promoter for synthetic rubber, a divalent metal hydroxide, etc. are also usable as the basic compound.

Examples of the polyhydroxy compound are polyhydroxy compounds having an enol type hydroxyl group (=C—OH), dihydroxy compounds of the formula: Rf″(CH$_2$OH)$_2$ wherein Rf″ is a polyfluoroalkylene group having 1 to 20 carbon atoms or a perchlorofluoroalkylene group having 1 to 20 carbon atoms, etc. They may be employed in the free form or the salt form (e.g. alkali metal salts). Specific examples of the polyhydroxy compound are hydroquinone, 2,2-bis(4-hydroxyphenyl)propane, 2,2-bis(4-hydroxyphenyl)perfluoropropane, 2,2-bis(4-hydroxyphenyl)butane, 1,1-bis(4-hydroxyphenyl)methane, 4,4'-dihydroxydiphenyl ether, HOCH$_2$(CF$_2$)$_3$CH$_2$OH, HOCH$_2$CF$_2$CFH(CF$_2$)$_3$CFHCF$_2$CH$_2$OH, HOCH$_2$CH$_2$CH$_2$(CF$_2$)$_3$CH$_2$CH$_2$CH$_2$OH, HOCH$_2$CF$_2$CH$_2$(CF$_2$)$_3$CH$_2$CF$_2$CH$_2$OH, etc. Their alkali metal salts are also usable.

As the polythiol compound, there is usually employed aliphatic or aromatic dithiols, of which specific examples are dimercaptodimethyl ether, dimercaptomethyl sulfide, 1,6-hexanedithiol, ethylenebismercaptoacetate, 1,5-naphthalenedithiol, 4,4'-dimercaptodiphenyl, etc. Their alkali metal salts are also usable.

Crosslinking of the polymer may be effected in the presence of a divalent metal oxide or hydroxide as an acid acceptor in addition to a crosslinking source. As the divalent metal oxide or hydroxide, there may be employed oxides and hydroxides of calcium, magnesium, lead, zinc, etc. The complex salts of those oxides and hydroxides are also usable. They are effective not only as an acid acceptor but also in enhancement of crosslinking property, mechanical property and heat resistance.

There may be further used tertiary amines, trisubstituted amidines, penta-substituted guanidines, etc. as well as their salts with organic or inorganic acids, their quaternary ammonium salts, their quaternary phosphonium salts, etc. as a crosslinking promoter. These crosslinking promoters are disclosed in Japanese Patent Publications (unexamined) Nos. 56854/1976, 1387/1972, 191/1972, etc. Moreover, monovalent metal salts (e.g. Na, K, Ag, Cu) of weak acids may be employed for the purpose of deiodination from the polymer of the invention.

In addition, other additives such as pigments, fillers, reinforcing materials, etc. may be incorporated. Examples of the filler or the reinforcing material include inorganic materials such as carbon black, titanium oxide, silica, clay and talc and organic materials such as polytetrafluoroethylene, polyvinylidene fluoride, polyvinyl fluoride, polychlorotrifluoroethylene, tetrafluoroethylene/ethylene copolymer and tetrafluoroethylene/vinylidene fluoride copolymer.

In order to mix the above materials together for preparation of a crosslinkable composition comprising the polymer of the invention, there may be adopted per se conventional mixing procedures depending upon the viscosity or physical state of the polymer. For instance, a mixer conventionally employed for liquid rubbers is favorably usable.

The crosslinked polymer is per se useful as a component for paints, adhesives, sealants, etc. due to its excellent heat resistance, oil resistance, chemical resistance, solvent resistance, etc.

Figure 2:
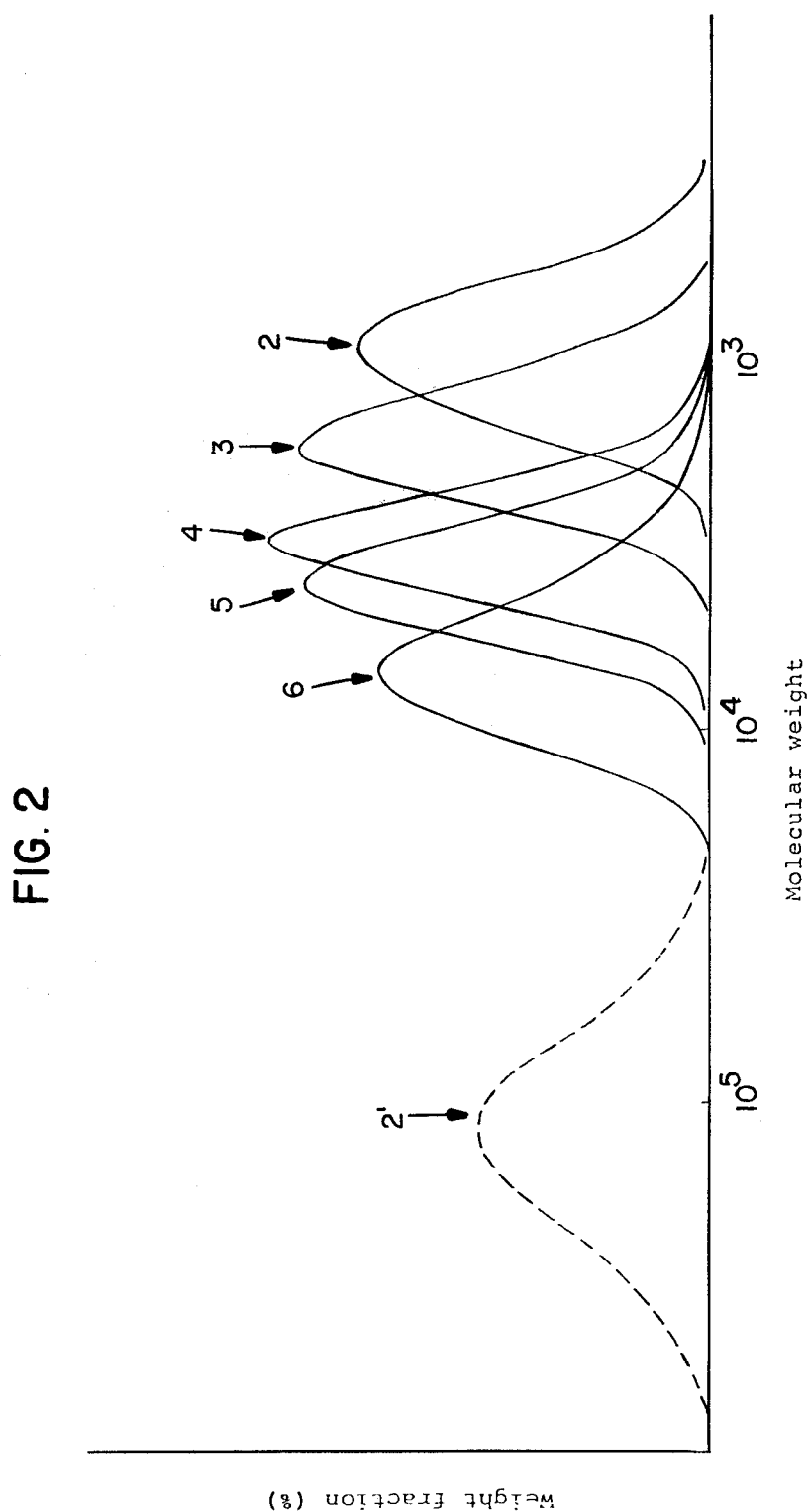

Practical embodiments of the invention are illustratively shown in the following Examples wherein part(s) and % are by weight unless otherwise indicated and in FIGS. 1 and 2.

EXAMPLE 1

A 3,200 ml volume stainless steel made autoclave equipped with an agitator was flushed with hexafluoropropylene (HFP), and a solution of trichloroperfluorohexanoyl peroxide (DLP) in trichlorotrifluoroethane (0.43 g/ml) (0.8 ml), 1,4-diiodoperfluorobutane (4FDI) (45.5 g) and HFP (1700 g) were charged therein at 23° C. Then, vinylidene fluoride (VdF) (600 g) was introduced into the autoclave, whereby the polymerization proceeded gradually with depression of the inner pressure. After 24 hours, the same DLP solution as above (0.8 ml) was added thereto under pressure. The reaction was further continued for 43 hours, and then the inner pressure was released, whereby a colorless, transparent liquid (243 g) was obtained. The M/I proportion in the polymerization system was about 208. The produced polymer had an iodine content of 6.84% by weight. The GPC (gel permeation chromatography) (column, each of $10^7$, $10^6$, $10^5$, $10^4$, $10^3$ and $10^2$; room temperature; manufactured by Water Associates) measured on the tetrahydrofuran solution gave a pattern (Curve 1) as shown in FIG. 1 of the accompanying drawings. The number average molecular weight ($\overline{Mn}$) calculated from the GPC pattern was 3,300, and the ratio of the weight average molecular weight ($\overline{Mw}$) to the number average molecular weight ($\overline{Mn}$) was 1.27.

The reaction conditions and the obtained results as above are summarized in Table 1.

The produced polymer (100 parts) was incorporated with diisopropyl peroxydicarbonate (1.2 parts) and triallyl isocyanurate (7.0 parts), and the resultant mixture was subjected to crosslinking at 100° C. for 30 minutes. The polymer before crosslinking was readily soluble in a large amount of acetone at room temperature, while the cured product was insoluble.

COMPARATIVE EXAMPLE 1

The polymerization was carried out as in Example 1 but using the amounts of the iodinated compound and the peroxide and adopting the polymerization time as shown in Table 1. The results are shown in Table 1, and the GPC pattern (Curve 1') of the product is shown in FIG. 1.

EXAMPLE 2

Into a 3,200 ml volume stainless steel made autoclave equipped with an agitator, water (1,490 ml) was charged, and the inner atmosphere was replaced by HFP. 4FDI (52 g) was introduced into the autoclave, and a mixture of VdF and HFP in a molar ratio of 45:55 was pressurized therein at 80° C. to make an inner pressure of 16 kg/cm$^2$G. A solution of ammonium persulfate (APS) (0.2 g) in water (10 ml) was added to the autoclave, whereby the polymerization proceeded gradually with depression of the inner pressure. When the inner pressure was lowered to 14 kg/cm$^2$G, a mixture of VdF and HFP in a molar ratio of 78:22 was introduced into the autoclave to make an inner pressure of 16 kg/cm$^2$G. With repetition of the above operation, the reaction was continued for 4.1 hours, during which APS (0.2 g) was added to the polymerization system after 3 hours from the start of the polymerization. The M/I proportion in the polymerization system was about 10.7. The product was a white aqueous dispersion, which was coagulated on freezing to give a liquid rubber (102 g). The iodine content was 26.4%. The GPC pattern (Curve 2) was as shown in FIG. 2. $\overline{Mn}$ determined from the GPC pattern was 903, and $\overline{Mw}/\overline{Mn}$ was 1.19. $n_D^{25}$=1.3945. Viscosity at 50° C., 94 cps.

EXAMPLES 3-6

The polymerization was carried out as in Example 2 but using the amount of the iodinated compound, effecting the additional introduction of APS (0.1 to 0.2 g per 3 hours) and adopting the polymerization time as shown in Table 2. The results are shown in Table 2. The GPC pattern of the product is shown in FIG. 2, wherein Curves 3 to 6 correspond to the products in Examples 3 to 6.

COMPARATIVE EXAMPLE 2

Into a 3,000 ml volume stainless steel made autoclave equipped with an agitator, water (1,500 ml) was charged, and ammonium perfluorooctanoate (7.5 g) was added thereto. The inner atmosphere was replaced by a mixture of VdF and HFP in a molar ratio of 45:55 to make an inner pressure of 14 kg/cm$^2$G. APS (5 mg) was dissolved in water and added to the autoclave. The polymerization was carried out while stirring at 80° C. under a pressure between 13 and 14 kg/cm$^2$G. I(CF$_2$CF$_2$)$_2$I (0.5 ml) was introduced therein at 25° C., and APS (20 mg) dissolved in water (10 ml) was added thereto, whereby the polymerization started immediately with depression of the inner pressure. When the pressure was lowered to 13 kg/cm$^2$G, a mixture of VdF and HFP in a molar ratio of 78:22 was introduced therein to make a pressure of 15 kg/cm$^2$G. With repetition of the above operation, the polymerization was continued under a pressure of 13 to 15 kg/cm$^2$G. After 22 hours, the temperature was rapidly lowered, and the pressure was released, whereby the polymerization was interrupted. APS (20 mg) dissolved in water (10 ml) was added to the polymerization system after 7 and 14 hours from the start of the polymerization, but the polymerization rate was almost constant without material acceleration. The M/I proportion in the polymerization system was about 1.4. The produced dispersion having a solid content of 20% was coagulated with 1% aqueous solution of potassium alum, and the coagulated product was collected, washed with water and dried to give a rubbery polymer, of which $\overline{Mn}$ was 140,000 (determined by GPC). The iodine content of the polymer was 0.18%. The GPC pattern (Curve 2') was as shown in FIG. 2.

TABLE 1

| Example | 4FDI (g) | DLP solution*(2) (ml × times) | Polymerization time (Hr) | M/I | Yield (g) | Iodine content (%) | $\overline{Mn}$*(1) | $\overline{Mw}/\overline{Mn}$ | $n_D^{25}$ |
| --- | --- | --- | --- | --- | --- | --- | --- | --- | --- |
| 1 | 45.5 | 0.8 × 2 | 67 | 208 | 243 | 6.84 | 3300 | 1.27 | 1.3736 |
| Comparative 1 | 15 | 0.8 × 2 | 101 | 629 | 228 | 2.30 | 12000 | 1.69 | — |

Note:
*(1)determined by GPC method;
*(2)0.43 g/ml.

TABLE 2

| Example | 4FDI (g) | APS (g × times) | Polymerization time (Hr) | M/I | Yield (g) | Iodine content (%) | $\overline{Mn}$ | $\overline{Mw}/\overline{Mn}$ | $n_D^{25}$ |
|---|---|---|---|---|---|---|---|---|---|
| 2 | 52.0 | 0.2 × 2 | 4.1 | 10.7 | 102 | 26.4 | 903*(2) | 1.19 | 1.3945 |
| 3 | 27.1 | 0.2 × 2 | 4.7 | 20.4 | 84.4 | 18.0 | 1390*(2) | 1.17 | 1.3859 |
| 4 | 18.5 | 0.2 × 2 | 5.75 | 30.0 | 80.4 | 11.3 | 2120*(2) | 1.16 | 1.3778 |
| 5 | 45.4 | 0.2 × 2<br>0.1 × 3 | 14 | 12.2 | 317 | 7.22 | 3330*(1) | 1.21 | 1.3749 |
| 6 | 34.1 | 0.2 × 2<br>0.1 × 3 | 17.7 | 16.3 | 410 | 4.56 | 5420*(1) | 1.30 | 1.3732 |

Note:
*(1)determined by GPC method;
*(2)determined by VOP (vapor pressure osmometry) method.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process for producing a readily crosslinkable liquid fluorine-containing polymer having a number average molecular weight of 900 to 10,000 and containing iodine in the molecule in an amount of 1 to 30% by weight based on the weight of the polymer, which comprises polymerizing vinylidene fluoride and at least one other fluoroolefin in the presence of a radical-producing source and an iodinated compound of the formula $RfI_x$, wherein Rf is selected from at least one member of the group consisting of a saturated perfluorocarbon group, a saturated perfluorochlorocarbon group or a saturated fluorochlorohydrocarbon group and x is an integer of not less than 1 corresponding to the bonding valency of Rf while maintaining the proportion of the mole number of the monomeric components (M) to the mole number of the iodinated compound (I) in a range between 10 and 1,200.

2. The process according to claim 1, wherein Rf has fluorine atom(s) and/or perfluorocarbon group(s) on all the remaining bonds of the carbon atom to which an iodine atom is bonded.

3. The process according to claim 1, wherein the other fluoroolefin is selected from at least one member of the group consisting of tetrafluoroolefin, chlorotrifluoroolefin, trifluoroethylene, vinyl fluoride, hexafluoropropylene, pentafluoropropylene, perfluoro(methyl vinyl ether), perfluoro (ethyl vinyl ether) or perfluoro(propyl vinyl ether).

4. The process according to claim 3, wherein the other fluoroolefin is hexafluoropropylene or its mixture with tetrafluoroethylene.

5. The process according to any one of claims 1 to 3, wherein the M/I proportion is in a range between 10 and 300.

6. The process according to any one of claims 1 to 3, wherein x is an integer of 1 or 2.

7. The process according to claim 6, wherein the polymer contains units of vinylidene fluoride in an amount of 10 to 90 mole %.

8. The process according to claim 7, wherein the polymer contains iodine in the molecule in an amount of 2 to 20% by weight based on the weight of the polymer.

9. The process according to claim 8, wherein the polymer is in a liquid state at a temperature of 0° to 150° C.

10. The process according to claim 1, wherein the polymer has the proportion of the weight average molecular weight ($\overline{Mw}$) to the number average molecular weight ($\overline{Mn}$) of 1.05 to 1.30.

11. A readily crosslinkable liquid, fluorine-containing polymer produced according to the process of claim 1.

12. A readily crosslinkable composition, which comprises the polymer of claim 11 and at least one crosslinking agent.

13. The composition according to claim 12, wherein the crosslinking agent is an organic peroxide, a polyamine or its salt, a polyhydroxy compound or its alkali metal salt, or a polythiol or its alkali metal salt.

14. A process for producing an elastomer which comprises producing a readily crosslinkable liquid, fluorine-containing polymer according to the process of claim 1, adding a crosslinking agent to the liquid fluorine-containing polymer produced and crosslinking said polymer to produce said elastomer.

15. The elastomer prepared according to the process of claim 14.

* * * * *